US010920121B1

(12) United States Patent
Alanqari et al.

(10) Patent No.: US 10,920,121 B1
(45) Date of Patent: Feb. 16, 2021

(54) METHODS OF REDUCING LOST CIRCULATION IN A WELLBORE USING SAUDI ARABIAN VOLCANIC ASH

(71) Applicant: Saudi Arabian Oil Company, Dhahran (SA)

(72) Inventors: Khawlah A. Alanqari, Al-Khubar (SA); Abdullah S. Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/822,645

(22) Filed: Mar. 18, 2020

(51) Int. Cl.
*E21B 21/00* (2006.01)
*C09K 8/03* (2006.01)
*E21B 33/138* (2006.01)

(52) U.S. Cl.
CPC .......... *C09K 8/032* (2013.01); *E21B 21/003* (2013.01); *E21B 33/138* (2013.01)

(58) Field of Classification Search
CPC .... C09K 8/032; E21B 221/003; E21B 33/138
See application file for complete search history.

(56) References Cited

U.S. PATENT DOCUMENTS

| 394,202 | A | 12/1888 | Miller |
| 745,512 | A | 12/1903 | Niedermeyer |
| 3,499,491 | A | 3/1970 | Wyant et al. |
| 3,605,898 | A | 9/1971 | Harrison et al. |
| 3,798,191 | A | 3/1974 | Donelly |
| 4,547,298 | A | 10/1985 | Novak |
| 4,760,882 | A | 8/1988 | Novak |
| 4,883,125 | A | 11/1989 | Wilson et al. |
| 4,953,620 | A | 9/1990 | Bloys et al. |
| 5,076,852 | A | 12/1991 | Bloys et al. |
| 5,295,543 | A | 3/1994 | Terry et al. |
| 5,320,171 | A | 6/1994 | Laramay |
| 5,361,841 | A | 11/1994 | Hale et al. |
| 5,398,758 | A | 3/1995 | Onan et al. |
| 5,421,409 | A | 6/1995 | Mueller et al. |
| 5,501,277 | A | 3/1996 | Onan et al. |
| 5,911,282 | A | 6/1999 | Onan et al. |
| 5,959,061 | A | 9/1999 | Neumann et al. |
| 6,448,206 | B1 | 9/2002 | Griffith et al. |
| 6,615,918 | B2 | 9/2003 | Bayliss et al. |
| 7,013,973 | B2 | 3/2006 | Danican et al. |
| 7,458,424 | B2 | 12/2008 | Odeh et al. |
| 7,631,632 | B2 | 12/2009 | Arov |
| 7,794,537 | B2 | 9/2010 | Barlet-Gouedard et al. |
| 7,846,250 | B2 | 12/2010 | Barlet-Gouedard et al. |
| 7,926,567 | B2 | 4/2011 | Harris et al. |
| 7,934,557 | B2 | 5/2011 | Nguyen |
| 7,954,549 | B2 | 6/2011 | Lende et al. |
| 8,273,426 | B1 | 9/2012 | Laramay et al. |
| 8,664,285 | B2 | 3/2014 | Birnbrich et al. |
| 8,703,659 | B2 | 4/2014 | Dalrymple et al. |
| 8,887,808 | B2 | 11/2014 | Kumar et al. |
| 9,006,151 | B2 | 4/2015 | Amanullah et al. |
| 9,023,150 | B2 | 5/2015 | Brenneis et al. |
| 9,045,965 | B2 | 6/2015 | Patil et al. |
| 9,133,386 | B2 | 9/2015 | Kumar et al. |
| 9,222,010 | B2 | 12/2015 | Porcherie et al. |
| 9,255,031 | B2 | 2/2016 | Pisklak et al. |
| 9,321,687 | B2 | 4/2016 | Gupta et al. |
| 9,376,901 | B2 | 6/2016 | Pantano |
| 9,410,066 | B2 | 8/2016 | Ghassemzadeh |
| 9,505,972 | B2 | 11/2016 | Iverson et al. |
| 9,695,653 | B2 | 7/2017 | Amanullah et al. |
| 9,840,653 | B2 | 12/2017 | Chatterij et al. |
| 9,863,231 | B2 * | 1/2018 | Hull ...................... E21B 43/267 |
| 9,890,082 | B2 | 2/2018 | Dubey |
| 9,932,510 | B2 | 4/2018 | Walker et al. |
| 9,957,434 | B2 | 5/2018 | van Oort et al. |
| 10,005,949 | B2 | 6/2018 | Roddy |
| 10,017,418 | B2 | 7/2018 | Thomas et al. |
| 10,035,945 | B2 | 7/2018 | Scorsone et al. |
| 10,053,612 | B2 | 8/2018 | Agapiou et al. |

(Continued)

FOREIGN PATENT DOCUMENTS

| CN | 1872766 A | 12/2006 |
| CN | 105884306 A | 8/2016 |

(Continued)

OTHER PUBLICATIONS

Ahdaya et al., "Investigating geopolymer cement performance in presence of water based drill fluid", Journal of Petroleum of Science and Engineering, vol. 176, pp. 934-942, Feb. 7, 2019.
Alp et al, "Utilization of Supplementary Cementitious Materials in Geothermal Well Cementing", Proceedings, Thirty-Eighth Workshop on Geothermal Reservoir Engineering, Stanford University, Stanford, California, Feb. 11-13, Feb. 11, 2013.
Al-Yami et al., "Chemical Additives for Oil Well Cementing", Research & Reviews: Journal of Chemistry, vol. 6, Issue 4, Oct. 20, 2017.
Hurley et al., Sodium Silicate Stabilization of Soils: A review of the literature, Chemical Stabilization on Foundations, pp. 46-79, 1972.
Liu et al., "Solidification of Synthetic-Based Drilling Mud Using Geopolymers", Society of Petroleum Engineers, SPE-180325-MS, Sep. 14, 2016.
Liu et al., "Geopolymer—Synthetic Based Mud Hybrid Cements for Primary Cementing and Lost Circulation Control", SPE-184558-MS, Apr. 3, 2017.
Piklowska et al., "Cement slurries used in drilling—types, properties, application", World Scientific News, vol. 76 pp. 149-165 Jun. 9, 2017.
US Dept of Energy, "Learning from Roman Seater Concrete", Advanced Light Source Communications Group, 2016.
Office Action dated Jun. 23, 2020 pertaining to U.S. Appl. No. 16/822,651, filed Mar. 18, 2020, 29 pgs.
Office Action dated Nov. 24, 2020 pertaining to U.S. Appl. No. 16/822,672 filed Mar. 18, 2020, 34 pgs.

(Continued)

*Primary Examiner* — Silvana C Runyan
(74) *Attorney, Agent, or Firm* — Dinsmore & Shohl LLP

(57) ABSTRACT

A method of reducing lost circulation includes introducing an activation solution comprising an aqueous solution, $Na_2SiO_3$, and NaOH into the wellbore and introducing Saudi Arabian volcanic ash into the wellbore. The Saudi Arabian volcanic ash comprises $SO_3$, CaO, $SiO_2$, $Al_2O_3$, $Fe_2O_3$, MgO, and $K_2O$. The method further includes allowing the Saudi Arabian volcanic ash to contact the activation solution in the wellbore, thereby forming a geopolymer barrier between the wellbore and a subsurface formation to reduce lost circulation in the wellbore.

17 Claims, No Drawings

(56) References Cited

U.S. PATENT DOCUMENTS

| | | |
|---|---|---|
| 10,077,636 B2 | 9/2018 | Marr et al. |
| 10,081,755 B2 | 9/2018 | Ballard |
| 10,087,107 B2 | 10/2018 | Allouche et al. |
| 10,087,353 B2 | 10/2018 | Amanullah |
| 10,100,602 B2 | 10/2018 | McDonald et al. |
| 10,112,869 B2 | 10/2018 | Agapiou |
| 10,113,389 B2 | 10/2018 | Pandey et al. |
| 10,119,060 B2 | 11/2018 | Pisklak et al. |
| 2004/0108113 A1* | 6/2004 | Luke ............... C09K 8/46 166/292 |
| 2004/0188091 A1 | 9/2004 | Luke et al. |
| 2007/0125272 A1 | 6/2007 | Johnson |
| 2008/0028995 A1* | 2/2008 | Barlet-Gouedard ............... C04B 28/006 106/811 |
| 2008/0099202 A1 | 5/2008 | Al-Dhafeeri et al. |
| 2011/0000400 A1 | 1/2011 | Roddy |
| 2011/0094746 A1 | 4/2011 | Allison et al. |
| 2014/0069644 A1 | 3/2014 | Reddy et al. |
| 2014/0158359 A1 | 6/2014 | Davidson et al. |
| 2015/0175481 A1 | 6/2015 | Pisklak et al. |
| 2016/0046853 A1 | 2/2016 | Chatterji et al. |
| 2016/0214901 A1 | 7/2016 | Muthusamy et al. |
| 2016/0264842 A1 | 9/2016 | Miller et al. |
| 2017/0001908 A1 | 1/2017 | Agapiou |
| 2017/0137694 A1 | 5/2017 | van Oort et al. |
| 2017/0298263 A1 | 10/2017 | Amanullah |
| 2017/0334779 A1 | 11/2017 | Gong et al. |
| 2020/0131427 A1* | 4/2020 | Alsaihati ............... C09K 8/46 |

FOREIGN PATENT DOCUMENTS

| | | |
|---|---|---|
| CN | 105980514 A | 9/2016 |
| GB | 1113205 A | 5/1968 |
| JP | 2004067419 A | 3/2004 |
| WO | 2012061187 A2 | 5/2012 |
| WO | 2016043712 A1 | 3/2016 |
| WO | 2016043979 A1 | 3/2016 |
| WO | 2016122530 A1 | 8/2016 |

OTHER PUBLICATIONS

Leonelli et al., "Volcanic ash as alternative raw materials for traditional vitrified ceramic products," Advances in Applied Ceramics, vol. 106, pp. 135-141; 2007. (Year: 2007).

Celik et al., "High-vol. natural volcanic pozzolan and limestone powder as partial replacements for portland cement in self-compacting and sustainable concrete," Cement & Concrete Composites, vol. 45, pp. 136-147; Sep. 18, 2013. (Year: 2013).

Khan et al., "Effect of Fineness of Basaltic Volcanic Ash on Pozzolanic Reactivity, ASR Expansion and Drying Shrinkage of Blended Cement Mortars," Materials, pp. 1-21; Aug. 15, 2019. (Year: 2019).

* cited by examiner

METHODS OF REDUCING LOST CIRCULATION IN A WELLBORE USING SAUDI ARABIAN VOLCANIC ASH

TECHNICAL FIELD

Embodiments of the present disclosure generally relate to methods of reducing lost circulation.

BACKGROUND

Drilling fluid loss—commonly referred to as lost circulation—is a significant problem in the oil and gas industry. Lost circulation arises from wellbore drilling that penetrates into geological formations that are fractured, cavernous, vugular, underpressured, or highly permeable, such as those with a permeability greater than 100 Darcys. Lost circulation is typically classified into four volumetric loss rate categories or zones, depending on the amount of fluid lost per unit of time: seepage losses are those associated with the loss of less than about 10 barrels per hour; partial losses are those associated with the loss of between about 10 barrels per hour and about 100 barrels per hour; severe losses are those associated with the loss of over about 100 barrels per hour; while total losses are those where no fluid returns to the surface of the wellbore and that typically necessitate abandoning the well. Typically, the sizes of these geological voids can be correlated to whether the potential for drilling fluid loss fits into one of these four categories.

Lost circulation can be prevented in some circumstances through the use of pre-drilling geomechanical models and related analytical tools, as well as through the use of reinforced wellbore wall and related strengthening. In circumstances where such preventive measures do not provide ample protection against lost circulation, a loss control material (or lost circulation material, LCM) may be introduced as an LCM pill or via the drilling fluid as a remediation approach. While exhibiting some benefit, these LCMs have traditionally been ineffective for severe loss zones such as those that arise from fractures with openings that exhibit conical, ovular, elliptical, circular, semi-circular, pseudo-cylindrical, triangular, curvi-planar or other shapes, as well as the various sizes of these fractures.

SUMMARY

Lost circulation encountered while drilling is a major problem in the oil and gas industry that is difficult to combat in severe loss zones. The LCMs typically introduced into the wellbore to combat severe losses are cheap, easy to access materials. These small LCMs may be easily dislodged from the wellbore fractures and allow further fluid loss instead of packing the fractures and effectively preventing fluid loss. However, these materials are typically individual rubber particles that are not adhered to each other, or, if there is an adhesive, the rubber particles adhered to each other are not capable of adhering to the subsurface formation and are not formed downhole within the subsurface formation, thereby formed within the fractures and blocking fluid loss. These conventional materials are not engineered for the specific purpose of remediating severe losses, and therefore are not effective at blocking the severe zone.

Accordingly, an improved approach to reducing or eliminating the loss of drilling fluid for such severe loss zones is warranted. The present embodiments address these needs by providing methods of forming geopolymer barriers (that function as LCM's) between a wellbore and subsurface formations that include Saudi Arabian volcanic ash to serve as an extender to decrease the density and increase the yield point of the geopolymer barrier.

In one embodiment, a method of reducing lost circulation is provided. The method includes introducing an activation solution comprising an aqueous solution, $Na_2SiO_3$, and NaOH into the wellbore and introducing Saudi Arabian volcanic ash into the wellbore. The Saudi Arabian volcanic ash comprises $SO_3$, CaO, $SiO_2$, $Al_2O_3$, $Fe_2O_3$, MgO, and $K_2O$. The method further includes allowing the Saudi Arabian volcanic ash to contact the activation solution in the wellbore, thereby forming a geopolymer barrier between the wellbore and a subsurface formation to reduce lost circulation in the wellbore.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "geopolymer barrier" refers to a composition comprising Saudi Arabian volcanic ash that is mixed with at least water to form cement. The geopolymer barrier may contain calcined alumina ($Al_2O_3$), silica ($SiO_2$), calcium oxide (CaO, also known as lime), iron oxide ($Fe_2O_3$), magnesium oxide (MgO), clay, sand, gravel, and mixtures thereof.

As used throughout this disclosure, the term "consistency" refers to a rheological property of matter related to the cohesion of the individual particles of a given material, its ability to deform and its resistance to flow. The consistency of the geopolymer barrier is determined by thickening time tests in accordance with API Recommended Practice 10B and is expressed in Bearden units of consistency (Bc), a dimensionless quantity with no direction conversion factor to more common units of viscosity. The Bearden units of consistency is measured on a scale from 1 to 100 where, conventionally, difficult pumping is thought to begin at 50 Bc, and cement is completely set at 100 Bc.

As used throughout this disclosure, the term "curing" refers to providing adequate moisture, temperature and time to allow the concrete to achieve the desired properties (such as hardness) for its intended use through one or more reactions between the water and the Saudi Arabian volcanic ash.

As used throughout this disclosure, the term "drying" refers to merely allowing the cement to achieve a moisture condition appropriate for its intended use, which may only involve physical state changes, as opposed to chemical reactions.

As used throughout this disclosure, the term "extender" refers to a cement extender, that is, a chemical additive or inert material used to decrease the density of a geopolymer barrier and increase the yield point. Reducing the slurry density reduces the hydrostatic pressure of the cement column in the wellbore, leading to successful wellbore isolation.

As used throughout this disclosure, the term "free of" as used to describe any chemical or component refers to not including more than trace amounts of the chemical or component, where trace amounts refers to having less than 0.1% of the chemical or component.

As used throughout this disclosure, the term "kick" is used to describe a flow of formation fluids into the wellbore during drilling operations. The kick is physically caused by the pressure in the wellbore being less than that of the formation fluids, thus causing flow. This condition of lower wellbore pressure than the formation is caused in two ways. First, if the mud weight is too low, then the hydrostatic pressure exerted on the formation by the fluid column may be insufficient to hold the formation fluid in the formation. This can happen if the mud density is suddenly decreased or if a drilled formation has a higher pressure than anticipated. This type of kick might be called an underbalanced kick. The second way a kick can occur is if dynamic and transient fluid pressure effects, usually due to motion of the drillstring or casing, effectively lower the pressure in the wellbore below that of the formation. This second kick type could be called an induced kick.

As used throughout this disclosure, the term "plastic viscosity" refers to the slope of the shear stress/shear rate line greater than the yield point. Plastic viscosity represents the viscosity of a fluid when extrapolated to infinite shear rate. Plastic viscosity is increased by a viscous base fluid and by excess colloidal solids.

As used throughout this disclosure, the term "point of departure" refers to the beginning of thickening of a geopolymer barrier during the thickening-time test, and is often abbreviated as POD. For some geopolymer barriers, the POD is used as the thickening time.

As used throughout this disclosure, the term "retarder" refers to a chemical agent used to increase the thickening time of geopolymer barrier to enable proper placement. The need for cement retardation increases with depth due to the greater time required to complete the cementing operation and the effect of increased temperature on the cement-setting process.

As used throughout this disclosure, the term "Saudi Arabian volcanic ash" refers to volcanic ash originally acquired from Saudi Arabia.

As used throughout this disclosure, the term "shear stress" refers to the force per unit area required to sustain a constant rate of fluid movement.

As used throughout this disclosure, the term "shear rate" refers to the rate of change of velocity at which one layer of fluid passes over an adjacent layer.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a geopolymer barrier remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bc.

As used throughout this disclosure, the term "wellbore" refers to the drilled hole or borehole, including the openhole or uncased portion of the well. Borehole may refer to the inside diameter of the wellbore wall, the rock face that bounds the drilled hole.

As used throughout this disclosure, the term "yield point" refers to the point in the stress-strain curve at which the curve levels off and plastic deformation begins to occur. Yield point is used to evaluate the void filling properties of cements and the ability of a cement to flow through the annulus. A greater yield point implies a non-Newtonian fluid, one that flows more uniformly than a fluid of similar density but lesser yield point. Yield point is increased by adding freshly dispersed clay or a flocculant, such as lime.

Embodiments of the present disclosure relate to methods of reducing lost circulation in a wellbore. The wellbore may serve to connect subsurface natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

As discussed previously, lost circulation is typically classified into four volumetric loss rate categories: seepage losses, partial losses, severe losses, and total losses. Typically, the size of these geological voids can be correlated to whether the potential for drilling fluid loss fits into one of these four zones. These geological voids, or fractures, may be measured by running logs down the annulus to determine the opening size of the fractures. During the drilling process, severe loss zones may be encountered. As used throughout this disclosure, the term "severe loss zone" refers to a lost circulation zone in which the amount of fluids lost per hour falls into the severe losses category. Severe loss zones may be found in fractured, cavernous, vugular, underpressured, or highly permeable formations, such as those with a permeability greater than 100 darcys. As used throughout this disclosure, the term "underpressured" refers to a formation with a pore pressure that is less than hydrostatic pressure. However, severe loss zones do not include impermeable or low permeability zones, overpressured zones, or deep sand.

This application discloses a method of reducing lost circulation by forming a geopolymer barrier between the wellbore and the subsurface formation. To ensure the stability and safety of a well, it is important that the geopolymer barrier maintains integrity and isolates the wellbore from the surrounding subsurface formations. If the geopolymer barrier cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid or hydrocarbon fluid loss from the wellbore into the surrounding subsurface formation, or in decreased wellbore pressure, possibly leading to a well control event. Therefore, wellbore integrity and isolation are critical to efficient production and use of a wellbore.

The method includes introducing an activation solution including an aqueous solution, sodium silicate ($Na_2SiO_3$), and sodium hydroxide (NaOH) into the wellbore. The aqueous phase may include at least one of fresh water, salt water, brine, municipal water, formation water, produced water, well water, filtered water, distilled water, sea water, or combinations thereof. The brine may include at least one of natural and synthetic brine, such as saturated brine or formate brine. The aqueous phase may use water containing organic compounds or salt. Without being bound by any particular theory, salt or other organic compounds may be incorporated into the aqueous phase to control the density of the activation solution. Increasing the saturation of the aqueous phase by increasing the salt concentration or the level of other organic compounds in the aqueous phase may increase the density of the activation solution. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase. Without being bound by any particular theory, brine may be used to create osmotic balance between the activation solution and the subterranean formation.

In some embodiments, the activation solution may contain from 10 weight percent (wt. %) to 70 wt. % of the aqueous phase based on the total weight of the activation solution. In some embodiments, the activation solution may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous phase.

The activation solution further includes $Na_2SiO_3$, and NaOH. In embodiments, the activation solution may include from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % $Na_2SiO_3$ based on the total weight of the activation solution. In embodiments, $Na_2SiO_3$ may be used as a shale stabilizer.

The $Na_2SiO_3$ may have a ratio of $Na_2O$ to $SiO_2$ of from 0.250:1 to 0.350:1, from 0.250:1 to 0.330:1, from 0.250:1 to 0.300:1, from 0.250:1 to 0.270:1, from 0.270:1 to 0.350:1, from 0.270:1 to 0.330:1, from 0.270:1 to 0.300:1, from 0.300:1 to 0.350:1, from 0.300:1 to 0.330:1, or from 0.330:1 to 0.350:1.

In embodiments, the activation solution may include from 15 to 35 wt. %, from 15 to 30 wt. %, from 15 to 25 wt. %, from 15 to 20 wt. %, from 20 to 35 wt. %, from 20 to 30 wt. %, from 20 to 25 wt. %, from 25 to 35 wt. %, from 25 to 30 wt. %, or from 30 to 35 wt. % NaOH based on the total weight of the activation solution. In embodiments, NaOH may be used as a pH control additive such that the activation solution has a pH of from 7 to 14, from 7 to 12, from 7 to 11, from 7 to 10, from 7 to 9, from 8 to 14, from 8 to 12, from 8 to 11, from 8 to 10, from 8 to 9, from 9 to 14, from 9 to 12, from 9 to 11, from 9 to 10, from 10 to 14, from 10 to 12, from 10 to 11, from 11 to 14, from 11 to 13, from 11 to 12, from 11.6 to 14, from 11.6 to 13, from 12 to 13, greater than 8, greater than 9, greater than 10, greater than 10.5, greater than 11, or greater than 11.6 when NaOH is present. Without intending to be bound by theory, NaOH may be used as a pH control additive to prevent corrosion in the wellbore. It is contemplated that the alkaline environment (when the pH is as described previously) may dissolve the alumina and silica, and allow for silicon and aluminum tetrahedral to form, thereby forming the geopolymer barrier by sharing oxygen atoms. A pH as described previously may accelerate the dissolution of the alumina and silica, thereby accelerating the formation of the geopolymer barrier.

In some embodiments, the activation solution may contain at least one additive other than $Na_2SiO_3$ or NaOH. The one or more additives may be any additives known to be suitable for activation solutions. As non-limiting examples, suitable additives may include fluid loss control agents, lost circulation control agents, filtration control additives, anti-foaming agents, emulsifiers, weighting agent, fluid loss additives, an alkali reserve, specialty additives, and combinations of these.

In some embodiments, the one or more additives may include an additional viscosifier, also referred to as a rheology modifier, which may be added to the activation solution to impart non-Newtonian fluid rheology to the activation solution to facilitate lifting and conveying rock cuttings to the surface of the wellbore. The viscosifier may include bentonite, polyacrylamide, polyanionic cellulose, or combinations of these. In some embodiments, the activation solution may include xanthan gum, a polysaccharide commonly referred to XC polymer. The XC polymer may be added to the water-based activation solution to produce a flat velocity profile of the water-based activation solution in annular flow, which may help to improve the efficiency of the activation solution in lifting and conveying rock cuttings to the surface.

In some embodiments, the activation solution may contain from 0.01 wt. % to 20 wt. % of the one or more additives based on the total weight of the activation solution. The activation solution may contain from 0.02 lb/bbl to 180 lb/bbl of the one or more additives based on the total weight of the activation solution, such as from 0.02 to 150 lb/bbl, or from 0.05 to 150 lb/bbl. In some embodiments, the activation solution may contain from 0.1 to 150 lb/bbl, or from 0.1 to 100 lb/bbl, or from 1 to 100 lb/bbl of the one or more additives.

The activation solution may include at least one weighting agent. In embodiments, the activation solution may be a drilling fluid. The weighting agent may be chosen from the group consisting of manganese oxide ($Mn_3O_4$), ferrosilicon, hausmannite, lime (CaO), calcium carbonate ($CaCO_3$), bentonite, montmorillonite clay, siderite ($FeCO_3$), ilmenite ($FeO.TiO_3$), barium sulfate (barite, ($BaSO_4$)), hematite ($Fe_2O_3$), mullite ($3Al_2O_3.2SiO_2$ or $2Al_2O_3.SiO_2$), kaolin ($Al_2Si_2O_5(OH)_4$ or kaolinite), alumina ($Al_2O_3$, or aluminum oxide), silicon carbide, tungsten carbide, and combinations thereof.

In some embodiments, the activation solution may contain from 0.01 wt. % to 20 wt. % of the at least one weighting agent based on the total weight of the activation solution. The activation solution may contain from 0.02 pounds per barrel (lb/bbl) to 180 lb/bbl of the one or more additives based on the total weight of the activation solution, such as from 0.02 to 150 lb/bbl, or from 0.05 to 150 lb/bbl. In some embodiments, the activation solution may contain from 0.1 to 150 lb/bbl, or from 0.1 to 100 lb/bbl, or from 1 to 100 lb/bbl of the one or more additives.

In some embodiments, the at least one weighting agent may include solids, which may be dispersed in the activation solution. The solids may be finely divided solids that may be added to the activation solution to increase the density of the activation solution. The solids may have a density of from 1 to 10 grams per centimeter cubed (g/cm$^3$), from 2 to 10 g/cm$^3$, from 3 to 10 g/cm$^3$, from 4 to 10 g/cm$^3$, from 4.5 to 10 g/cm$^3$, from 5 to 10 g/cm$^3$, from 6 to 10 g/cm$^3$, from 8 to 10 g/cm$^3$, from 1 to 8 g/cm$^3$, from 2 to 8 g/cm$^3$, from 3 to 8 g/cm$^3$, from 4 to 8 g/cm$^3$, from 4.5 to 8 g/cm$^3$, from 5 to 8 g/cm$^3$, from 6 to 8 g/cm$^3$, from 1 to 6 g/cm$^3$, from 2 to 6 g/cm$^3$, from 3 to 6 g/cm$^3$, from 4 to 6 g/cm$^3$, from 4.5 to 6 g/cm³, from 5 to 6 g/cm³, from 1 to 5 g/cm³, from 2 to 5 g/cm³, from 3 to 5 g/cm³, from 4 to 5 g/cm³, from 4.5 to 5 g/cm³, from 1 to 4.5 g/cm³, from 2 to 4.5 g/cm³, from 3 to 4.5 g/cm³, from 4 to 4.5 g/cm³, from 1 to 4 g/cm³, from 2 to 4 g/cm³, from 3 to 4 g/cm³, from 1 to 3 g/cm³, or from 2 to 3 g/cm³.

In embodiments, the activation solution may have a solids content of from 1 wt. % to 80 wt. % based on the weight of the solid weighing material based on the total weight of the activation solution. The activation solution may have a solids content of from 2.5 lb/bbl to 720 lb/bbl, such as from 2.5 to 720 lb/bbl, or 2.5 to 700 lb/bbl. In some embodiments, the activation solution may have a solids content of from 5 to 700 lb/bbl, from 50 to 500 lb/bbl, or from 100 to 600 lb/bbl.

As stated, the addition of solids may be used to control the density of the activation solution. In some embodiments, the activation solution may have a density of from 50 pounds of mass per cubic foot (pcf) to 160 pcf, as measured using a mud balance in accordance with the American Petroleum Institute (API) recommended practice 13B-2. The activation solution may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the activation solution may have a density of from 50 pcf to 75 pcf, or from 75 pcf to 100 pcf, or from 120 pcf to 160 pcf. In some embodiments, mud weights less than 100 pcf may be used when drilling depleted formations.

The method further includes introducing Saudi Arabian volcanic ash into the wellbore. In embodiments, the method may include mixing the activation solution and the Saudi Arabian volcanic ash prior to introducing both the activation solution and the Saudi Arabian volcanic ash into the wellbore. In embodiments, the method may include allowing the Saudi Arabian volcanic ash to contact the activation solution in the wellbore.

The Saudi Arabian volcanic ash may have a particle size of from 20 to 30 microns. The Saudi Arabian volcanic ash is free of $TiO_2$. The Saudi Arabian volcanic ash may comprise from 0.05 to 2 wt. %, from 0.05 to 1 wt. %, from 0.05 to 0.8 wt. %, from 0.05 to 0.5 wt. %, from 0.05 to 0.2 wt. %, from 0.05 to 0.15 wt. %, from 0.05 to 0.1 wt. %, from 0.1 to 2 wt. %, from 0.1 to 1 wt. %, from 0.1 to 0.8 wt. %, from 0.1 to 0.5 wt. %, from 0.1 to 0.2 wt. %, from 0.1 to 0.15 wt. %, from 0.15 to 2 wt. %, from 0.15 to 1 wt. %, from 0.15 to 0.8 wt. %, from 0.15 to 0.5 wt. %, from 0.15 to 0.2 wt. %, from 0.2 to 2 wt. %, from 0.2 to 1 wt. %, from 0.2 to 0.8 wt. %, or from 0.2 to 0.5 wt. % $SO_3$. More specifically, the Saudi Arabian volcanic ash may comprise from 0.05 to 0.2 wt. % $SO_3$, from 5 to 10 wt. % CaO, from 40 to 50 wt. % $SiO_2$, from 10 to 20 wt. % $Al_2O_3$, from 10 to 15 wt. % $Fe_2O_3$, from 5 to 10 wt. % MgO, and from 0.5 to 5 wt. % $K_2O$. The geopolymer barrier may include from 2 to 80 wt. % BWOV, from 5 to 80 wt. % BWOV, from 8 to 80 wt. % BWOV, from 15 to 80 wt. % BWOV, from 25 to 80 wt. % BWOV, from 40 to 80 wt. % BWOV, from 50 to 80 wt. % BWOV, from 60 to 80 wt. % BWOV, from 2 to 60 wt. % BWOV, from 5 to 60 wt. % BWOV, from 8 to 60 wt. % BWOV, from 15 to 60 wt. % BWOV, from 25 to 60 wt. % BWOV, from 40 to 60 wt. % BWOV, from 50 to 60 wt. % BWOV, from 2 to 50 wt. % BWOV, from 5 to 50 wt. % BWOV, from 8 to 50 wt. % BWOV, from 15 to 50 wt. % BWOV, from 25 to 50 wt. % BWOV, from 40 to 50 wt. % BWOV, from 2 to 40 wt. % BWOV, from 5 to 40 wt. % BWOV, from 8 to 40 wt. % BWOV, from 15 to 40 wt. % BWOV, from 25 to 40 wt. % BWOV, from 2 to 25 wt. % BWOV, from 5 to 25 wt. % BWOV, from 8 to 25 wt. % BWOV, from 15 to 25 wt. % BWOV, from 2 to 15 wt. % BWOV, from 5 to 15 wt. % BWOV, from 8 to 15 wt. % BWOV, from 2 to 8 wt. % BWOV, or from 5 to 8 wt. % BWOV Saudi Arabian volcanic ash.

The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % CaO. The Saudi Arabian volcanic ash may comprise from 30 to 70 wt. %, from 30 to 60 wt. %, from 30 to 55 wt. %, from 30 to 50 wt. %, from 30 to 45 wt. %, from 30 to 40 wt. %, from 35 to 70 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 60 wt. %, from 40 to 55 wt. %, from 40 to 50 wt. %, from 40 to 45 wt. %, from 45 to 70 wt. %, from 45 to 60 wt. %, from 45 to 55 wt. %, from 45 to 50 wt. %, from 50 to 70 wt. %, from 50 to 60 wt. %, or from 50 to 55 wt. % $SiO_2$. The Saudi Arabian volcanic ash may comprise from 2 to 40 wt. %, from 2 to 35 wt. %, from 2 to 30 wt. %, from 2 to 25 wt. %, from 2 to 20 wt. %, from 2 to 15 wt. %, from 2 to 10 wt. %, from 2 to 5 wt. %, from 5 to 40 wt. %, from 5 to 35 wt. %, from 5 to 30 wt. %, from 5 to 25 wt. %, from 5 to 20 wt. %, from 5 to 15 wt. %, from 5 to 10 wt. %, from 10 to 40 wt. %, from 10 to 35 wt. %, from 10 to 30 wt. %, from 10 to 25 wt. %, from 10 to 20 wt. %, from 10 to 15 wt. %, from 15 to 40 wt. %, from 15 to 35 wt. %, from 15 to 30 wt. %, from 15 to 25 wt. %, from 15 to 20 wt. %, from 20 to 40 wt. %, from 20 to 35 wt. %, from 20 to 30 wt. %, from 20 to 25 wt. % $Al_2O_3$. The Saudi Arabian volcanic ash may comprise from 2 to 30 wt. %, from 2 to 25 wt. %, from 2 to 20 wt. %, from 2 to 15 wt. %, from 2 to 13 wt. %, from 2 to 10 wt. %, from 2 to 8 wt. %, from 2 to 5 wt. %, from 5 to 30 wt. %, from 5 to 25 wt. %, from 5 to 20 wt. %, from 5 to 15 wt. %, from 5 to 13 wt. %, from 5 to 10 wt. %, from 5 to 8 wt. %, from 8 to 30 wt. %, from 8 to 25 wt. %, from 8 to 20 wt. %, from 8 to 15 wt. %, from 8 to 13 wt. %, from 8 to 10 wt. %, from 10 to 30 wt. %, from 10 to 25 wt. %, from 10 to 20 wt. %, from 10 to 15 wt. %, from 10 to 13 wt. %, from 13 to 30 wt. %, from 13 to 25 wt. %, from 13 to 20 wt. %, from 13 to 15 wt. %, from 15 to 30 wt. %, from 15 to 25 wt. %, or from 15 to 20 wt. % $Fe_2O_3$. The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % MgO. The Saudi Arabian volcanic ash may comprise from 0.2 to 10 wt. %, from 0.2 to 7 wt. %, from 0.2 to 5 wt. %, from 0.2 to 3 wt. %, from 0.2 to 2 wt. %, from 0.2 to 1 wt. %, from 0.2 to 0.5 wt. %, from 0.5 to 10 wt. %, from 0.5 to 7 wt. %, from 0.5 to 5 wt. %, from 0.5 to 3 wt. %, from 0.5 to 2 wt. %, from 0.5 to 1 wt. %, from 1 to 10 wt. %, from 1 to 7 wt. %, from 1 to 5 wt. %, from 1 to 3 wt. %, from 1 to 2 wt. %, from 2 to 10 wt. %, from 2 to 7 wt. %, from 2 to 5 wt. %, from 1 to 3 wt. %, from 3 to 10 wt. %, from 3 to 7 wt. %, from 3 to 5 wt. %, from 5 to 10 wt. %, or from 5 to 7 wt. % $K_2O$.

In embodiments, introducing Saudi Arabian volcanic ash into the wellbore includes introducing an ash solution including an aqueous solution and Saudi Arabian volcanic ash. The method of making the ash solution of the present disclosure includes mixing Saudi Arabian volcanic ash and an aqueous solution to form the ash solution, in which the Saudi Arabian volcanic ash comprises $SO_3$, CaO, $SiO_2$, $Al_2O_3$, $Fe_2O_3$, MgO, and $K_2O$. Without being bound by any particular theory, use of Saudi Arabian volcanic ash may provide the geopolymer barrier with increased yield point, reduced density, improved mechanical properties, and increased resistance to $H_2S$ of the geopolymer barrier.

The mixing step, in some embodiments, may involve shearing the aqueous solution, and Saudi Arabian volcanic ash and, optionally, other additives at a suitable speed for a suitable period of time to form the ash solution. In one embodiment, the mixing may be done in the lab using a standard API blender for 15 seconds at 4,000 revolutions per minute (rpm) and 35 seconds at 12,000 rpm. The equation of mixing energy is:

$$\frac{E}{M} = \frac{k\omega^2 t}{V} \quad \text{(Equation 1)}$$

Where
E=Mixing energy (kiloJoules (kJ))
M=Mass of slurry (kilograms (kg))
k=6.1×10$^{-8}$ m$^5$/s (constant found experimentally)
ω=Rotational speed (radians/second (s$^{-1}$))
t=Mixing time (s)
V=Slurry volume (m$^3$)

An aqueous solution may be added to the Saudi Arabian volcanic ash to produce the ash solution. The aqueous solution may include one or more than one of deionized water, tap water, fresh water, salt water, natural or synthetic brine, municipal water, formation water, produced water, well water, filtered water, distilled water, sea water, other type of water, or combinations of waters. In some embodiments, the aqueous solution may include water or a solution containing water and one or more inorganic compounds dissolved in the water or otherwise completely miscible with the water. In some embodiments, the aqueous solution may contain brine, including natural and synthetic brine. In some embodiments, salt or other organic compounds may be incorporated into the aqueous solution to control certain properties of the ash solution, and thus the geopolymer barrier, such as density. Without being bound by any particular theory, increasing the saturation of the aqueous solution by increasing the salt concentration or the level of other organic compounds in the water may increase the density of the ash solution, and thus, the geopolymer barrier. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the ash solution may contain from 10 to 70 weight percent (wt. %) by weight of volcanic ash (BWOV) aqueous solution. In some embodiments, the ash solution may contain from 10 to 40 wt. %, from 10 to 30 wt. %, from 10 to 20 wt. %, from 20 to 40 wt. %, from 25 to 35 wt. %, or from 20 to 30 wt. % BWOV water. The ash solution may contain 30 wt. % BWOV aqueous solution.

Along with the aqueous solution and Saudi Arabian volcanic ash, the ash solution may further include sodium silicate ($Na_2SiO_3$). The ash solution may include from 20 to 50 wt. %, from 20 to 45 wt. %, from 20 to 40 wt. %, from 20 to 35 wt. %, from 20 to 30 wt. %, from 20 to 25 wt. %, from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % $Na_2SiO_3$ BWOV. The $Na_2SiO_3$ may have a ratio of $Na_2O$ to $SiO_2$ of from 0.250:1 to 0.350:1, from 0.250:1 to 0.330:1, from 0.250:1 to 0.300:1, from 0.250:1 to 0.270:1, from 0.270:1 to 0.350:1, from 0.270:1 to 0.330:1, from 0.270:1 to 0.300:1, from 0.300:1 to 0.350:1, from 0.300:1 to 0.330:1, or from 0.330:1 to 0.350:1.

Along with the aqueous solution and Saudi Arabian volcanic ash, the ash solution may further include sodium hydroxide (NaOH). The ash solution may include from 3 to 10 wt. %, from 3 to 8 wt. %, from 3 to 6 wt. %, from 3 to 4 wt. %, from 4 to 10 wt. %, from 4 to 8 wt. %, from 4 to 6 wt. %, from 6 to 10 wt. %, from 6 to 8 wt. %, or from 8 to 10 wt. % NaOH BWOV.

The ash solution may have a pH of greater than 7. In embodiments, the geopolymer barrier may have a pH of from 8 to 14, from 9 to 13, from 10 to 13, from 11 to 13, from 11.5 to 13.0, from 11.5 to 12.5, or from 11.5 to 12.0.

As stated previously, the method includes allowing the Saudi Arabian volcanic ash (or the ash solution as defined in this disclosure) to contact the activation solution in the wellbore, thereby converting the activation solution into the geopolymer barrier. The Saudi Arabian volcanic ash functions as an extender, reducing the density of the geopolymer barrier and increasing the yield point of the geopolymer barrier. In embodiments, the geopolymer barrier may include from 30 to 70 wt. %, from 30 to 65 wt. %, from 30 to 60 wt. %, from 30 to 55 wt. %, from 30 to 50 wt. %, from 30 to 45 wt. %, from 30 to 40 wt. %, from 30 to 35 wt. %, from 35 to 70 wt. %, from 35 to 65 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 65 wt. %, from 40 to 60 wt. %, from 40 to 55 wt. %, from 40 to 50 wt. %, from 40 to 45 wt. %, from 45 to 70 wt. %, from 45 to 65 wt. %, from 45 to 60 wt. %, from 45 to 55 wt. %, from 45 to 50 wt. %, from 50 to 70 wt. %, from 50 to 65 wt. %, from 50 to 60 wt. %, from 50 to 55 wt. %, from 55 to 70 wt. %, from 55 to 65 wt. %, from 55 to 60 wt. %, from 60 to 70 wt. %, from 60 to 65 wt. %, or from 65 to 70 wt. % Saudi Arabian volcanic ash by weight of the geopolymer barrier.

The geopolymer barrier may have a pH of greater than 7. In embodiments, the geopolymer barrier may have a pH of from 8 to 14, from 8 to 13, from 8 to 12, from 8 to 11, from 8 to 10, from 8 to 9, from 9 to 14, from 9 to 13, from 9 to 12, from 9 to 11, from 9 to 10, from 10 to 14, from 10 to 13, from 10 to 12, from 10 to 11, from 11 to 14, from 11 to 13, from 11 to 12, from 12 to 14, from 12 to 13, from 13 to 14, from 11.5 to 13.0, from 11.5 to 12.5, or from 11.5 to 12.0.

In embodiments, the geopolymer barrier may include a sodium aluminosilicate hydrate. This sodium aluminosilicate hydrate may be a reaction product of the Saudi Arabian volcanic ash, $Na_2SiO_3$, and NaOH. Specifically, a polycondensation of silicate and aluminate monomers (from the Saudi Arabian volcanic ash) under alkaline conditions (due to the addition of NaOH and $Na_2SiO_3$) may occur, forming the sodium aluminosilicate hydrate. In preparing the geopolymer barrier, it was expected to be desirable to have approximately a 1.0:1.0 molar ratio of $Na_2O$ combined with NaOH to aluminate ($Al_2O_3$). It was contemplated that this may balance the negative charge on the Al atom with the sodium ions in the sodium aluminosilicate hydrate structure.

However, after preparing a geopolymer barrier with a molar ratio of $Na_2O$ and NaOH to $Al_2O_3$ of 0.97:1.0, the resulting geopolymer barrier had an undesirably quick gelation time that would make sealing a severe loss zone difficult. To address this unexpected outcome, the ratio of $Na_2O$ and NaOH combined to $Al_2O_3$ in the geopolymer barrier of the present disclosure may range from 0.30:1.00 to 0.90:1.00, from 0.30:1.00 to 0.80:1.00, from 0.30:1.00 to 0.75:1.00, from 0.30:1.00 to 0.70:1.00, from 0.30:1.00 to 0.65:1.00, from 0.30:1.00 to 0.60:1.00, from 0.30:1.00 to 0.55:1.00, from 0.30:1.00 to 0.50:1.00, from 0.30:1.00 to 0.40:1.00, from 0.40:1.00 to 0.90:1.00, from 0.40:1.00 to 0.80:1.00, from 0.40:1.00 to 0.75:1.00, from 0.40:1.00 to 0.70:1.00, from 0.40:1.00 to 0.65:1.00, from 0.40:1.00 to 0.60:1.00, from 0.40:1.00 to 0.55:1.00, from 0.40:1.00 to 0.50:1.00, from 0.50:1.00 to 0.90:1.00, from 0.50:1.00 to 0.80:1.00, from 0.50:1.00 to 0.75:1.00, from 0.50:1.00 to 0.70:1.00, from 0.50:1.00 to 0.65:1.00, from 0.50:1.00 to 0.60:1.00, from 0.50:1.00 to 0.55:1.00, from 0.55:1.00 to 0.90:1.00, from 0.55:1.00 to 0.80:1.00, from 0.55:1.00 to 0.75:1.00, from 0.55:1.00 to 0.70:1.00, from 0.55:1.00 to 0.65:1.00, from 0.55:1.00 to 0.60:1.00, from 0.60:1.00 to 0.90:1.00, from 0.60:1.00 to 0.80:1.00, from 0.60:1.00 to 0.75:1.00, from 0.60:1.00 to 0.70:1.00, from 0.60:1.00 to 0.65:1.00, from 0.65:1.00 to 0.90:1.00, from 0.65:1.00 to 0.80:1.00, from 0.65:1.00 to 0.75:1.00, from 0.65:1.00 to 0.70:1.00, from 0.70:1.00 to 0.90:1.00, from 0.70:1.00 to 0.80:1.00, from 0.70:1.00 to 0.75:1.00, from 0.75:1.00 to 0.90:1.00, from 0.75:1.00 to 0.80:1.00, or from 0.80:1.00 to 0.90:1.00.

In embodiments, the ratio of $Na_2SiO_3$ combined with NaOH to $Al_2O_3$ may range from 0.5:1.0 to 9.0:1.0, from 0.5:1.0 to 7.0:1.0, from 0.5:1.0 to 5.0:1.0, from 0.5:1.0 to 3.0:1.0, from 0.5:1.0 to 2.0:1.0, from 0.5:1.0 to 1.5:1.0, from 0.5:1.0 to 1.0:1.0, from 1.0:1.0 to 9.0:1.0, from 1.0:1.0 to 7.0:1.0, from 1.0:1.0 to 5.0:1.0, from 1.0:1.0 to 3.0:1.0, from 1.0:1.0 to 2.0:1.0, from 1.0:1.0 to 1.5:1.0, from 1.5:1.0 to 9.0:1.0, from 1.5:1.0 to 7.0:1.0, from 1.5:1.0 to 5.0:1.0, from 1.5:1.0 to 3.0:1.0, from 1.5:1.0 to 2.0:1.0, from 2.0:1.0 to 9.0:1.0, from 2.0:1.0 to 7.0:1.0, from 2.0:1.0 to 5.0:1.0, from 2.0:1.0 to 3.0:1.0, from 3.0:1.0 to 9.0:1.0, from 3.0:1.0 to 7.0:1.0, from 3.0:1.0 to 5.0:1.0, from 5.0:1.0 to 9.0:1.0, from 5.0:1.0 to 7.0:1.0, or from 7.0:1.0 to 9.0:1.0.

The sodium aluminosilicate hydrate may have a formula of $Na_n[(-SiO_2)_z-AlO_2]_n \cdot y\ H_2O$, where n represents a degree of polymerization ranging from 1 to 50, from 1 to 40, from 1 to 30, from 1 to 25, from 1 to 20, from 1 to 15, from 1 to 10, from 1 to 5, from 5 to 50, from 5 to 40, from 5 to 30, from 5 to 25, from 5 to 20, from 5 to 15, from 5 to 10, from 10 to 50, from 10 to 40, from 10 to 30, from 10 to 25, from 10 to 20, from 10 to 15, from 15 to 50, from 15 to 40, from 15 to 30, from 15 to 25, from 15 to 20, from 20 to 50, from 20 to 40, from 20 to 30, from 20 to 25, from 25 to 50, from 25 to 40, from 25 to 30, from 30 to 50, from 30 to 40, or from 40 to 50, and z represents an amount of silicate ranging from 2 to 10, from 2 to 8, from 2 to 6, from 2 to 5, from 2 to 4, from 4 to 10, from 4 to 8, from 4 to 6, from 4 to 5, from 5 to 10, from 5 to 8, from 5 to 6, from 6 to 10, from 6 to 8, or from 8 to 10. The sodium aluminosilicate hydrate may have a structure as shown in Structure 1:

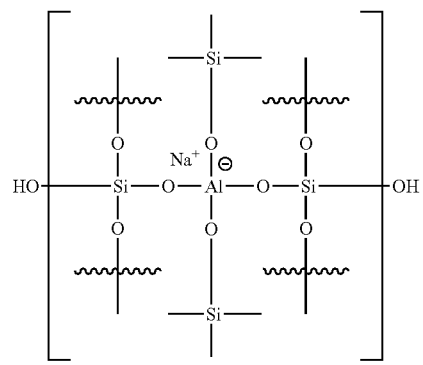

Structure 1

The sodium aluminosilicate hydrate may have a compressive strength of from 500 to 5000 psi, from 500 to 3000 psi, from 500 to 2600 psi, from 500 to 2200 psi, from 500 to 2000 psi, from 500 to 1500 psi, from 500 to 1000 psi, from 1000 to 5000 psi, from 1000 to 3000 psi, from 1000 to 2600 psi, from 1000 to 2200 psi, from 1000 to 2000 psi, from 1000 to 1500 psi, from 1500 to 5000 psi, from 1500 to 3000 psi, from 1500 to 2600 psi, from 1500 to 2200 psi, from 1500 to 2000 psi, from 2000 to 5000 psi, from 2000 to 3000 psi, from 2000 to 2600 psi, from 2000 to 2200 psi, from 2200 to 5000 psi, from 2200 to 3000 psi, from 2200 to 2600 psi, from 2600 to 5000 psi, from 2600 to 3000 psi, or from 3000 to 5000 psi.

In some embodiments the geopolymer barrier may contain a cement precursor material. The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under temperatures greater than 1000° C. that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the geopolymer barrier of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition. In other embodiments, the cement precursor material may be Saudi cement precursor, a combination of Portland cement precursor and crystalline silica, also known as quartz.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, other similar compounds, and combinations of these. The cement precursor material may include Portland cement, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The geopolymer barrier may include Saudi Class G cement. Saudi Class G cement may include from 60 to 100 wt. %, from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 Portland cement. Saudi Class G cement may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica, or quartz. Saudi Class G cement may have a pH of greater than 7, of from 8 to 14, of from 10 to 13, of from 11 to 13, of from 12 to 13, or of 12.4. Saudi Class G cement may have a bulk density at 20° C. of from 70 to 120 lb/ft³, of from 80 to 110 lb/ft³, of from 90 to 100 lb/ft³, or of 94 lb/ft³. Saudi Class G cement may have a solubility in water of from 0.1 to 2 grams per 100 milliliters (g/100 ml), of from 0.1 to 1 g/100 ml, of from 0.1 to 0.8 g/100 ml, of from 0.1 to 0.5 g/100 ml, of from 0.2 to 2 g/100 ml, of from 0.2 to 1 g/100 ml, of from 0.2 to 0.8 g/100 ml, of from 0.2 to 0.5 g/100 ml, of from 0.4 to 2 g/100 ml, of from 0.4 to 1 g/100 ml, of from 0.4 to 0.8 g/100 ml, of from 0.4 to 0.5 g/100 ml, of from 0.5 to 2 g/100 ml, of from 0.5 to 1 g/100 ml, of from 0.5 to 0.8 g/100 ml, or of 0.5 g/100 ml.

In some embodiments, the geopolymer barrier may contain at least one additive other than Saudi Arabian volcanic ash. As non-limiting examples, suitable additives may include accelerators, retarders, extenders, weighting agents, fluid loss control agents, lost circulation control agents, surfactants, antifoaming agents, specialty additives such as elastomers or fibers, and combinations of these.

In some embodiments, the geopolymer barrier may contain from 0.1 to 10 wt. % BWOV of the one or more additives based on the total weight of the geopolymer barrier. For instance, the geopolymer barrier may contain from 0.1 to 8 wt. % BWOV of the one or more additives, from 0.1 to 5 wt. % BWOV of the one or more additives, or from 0.1 to 3 wt. % BWOV of the one or more additives. The geopolymer barrier may contain from 1 to 10 wt. % BWOV of the one or more additives, from 1 to 8 wt. % BWOV, from 1 to 5 wt. % BWOV, or from 1 to 3 wt. % BWOV of the one or more additives. In some embodiments, the geopolymer barrier may contain from 3 to 5 wt. % BWOV, from 3 to 8 wt. % BWOV, from 3 to 10 wt. % BWOV, or from 5 to 10 wt. % BWOV of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, other anionic groups, or combinations of any of these. Without being bound by any particular theory, in some embodiments, the anionic groups on the dispersant may be adsorbed on the surface of the cement particles to impart a negative charge to the geopolymer barrier. The electrostatic repulsion of the negatively charged cement particles may allow the geopolymer barrier to be dispersed and more fluid-like, improving flowability. This may allow for one or more of turbulence at lesser pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the geopolymer barrier and may, in some embodiments, cause additional retardation effects.

In some embodiments, the geopolymer barrier may contain from 0.1 to 10 wt. % BWOV of one or more fluid loss additives, the one or more dispersants, or both. The geopolymer barrier may contain from 0.02 to 90 pound per barrel (lb/bbl) of the fluid loss additives, the one or more dispersants, or both based on the total weight of the geopolymer barrier. For instance, the geopolymer barrier may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

The geopolymer barrier may have a thickening time at 100° F. of greater than 1, 1.5, 1.75, 2, 2.5, 3, 5, 10, or 12 hours. The geopolymer barrier may have a thickening time at 100° F. of less than 1, 1.5, 1.75, 2, 2.5, 3, 3.5, 5, 10, or 12 hours. A thickening time test is used to simulate pumping conditions in order to determine a length of time before the cement becomes difficult or impossible to pump. The most common method to determine thickening time is via a pressurized consistometer. This device allows pressure and temperature to be applied to a geopolymer barrier while it is being stirred (typically at 150 rpm). A resistor arm on a potentiometer indicates resistance to the paddle turning as the cement sets. The apparatus is calibrated to a standard output in Bearden Consistency units. The device is fully automated and can simulate squeeze schedules and/or batch mixing, etc.

The geopolymer barrier may have a density of from 100 to 140 pcf. In embodiments, the geopolymer barrier may have a density of from 100 to 130 pcf, from 100 to 120 pcf, from 100 to 115 pcf, from 100 to 110 pcf, from 100 to 105 pcf, from 105 to 140 pcf, from 105 to 130 pcf, from 105 to 120 pcf, from 105 to 115 pcf, from 105 to 110 pcf, from 110 to 140 pcf, from 110 to 130 pcf, from 110 to 120 pcf, from 110 to 115 pcf, from 115 to 140 pcf, from 115 to 130 pcf, from 115 to 120 pcf, from 120 to 140 pcf, from 120 to 130 pcf, or from 130 to 140 pcf. In embodiments, the geopolymer barrier may have a density of less than 140 pcf, less than 130 pcf, less than 120 pcf, less than 117 pcf, less than 115 pcf, less than 110 pcf, or less than 106 pcf.

The viscosity of the geopolymer barrier compositions may be measured using a standard oilfield viscometer, such as a FANN® Model 35 viscometer manufactured by Fann Instrument Company for example, according to test methods provided in the API Recommended Practice For Field Testing Water-Based Cement (RP 13B-1/ISO 10414-1:2002). The viscometer reports shear stress readings at various shear rates. The shear stress readings are reported in units of pounds of force per 100 square feet (lbf/100 ft²). The shear rate is measured in rpm. The viscometer may report shear stress readings at shear rates of at least one of 600 rpm, 300 rpm, 200 rpm, 100 rpm, 6 rpm, or 3 rpm. These shear stress readings may be used to determine the viscosity of the geopolymer barrier at any of the shear rates, using Equation 4, assuming a viscometer with an R1 rotor sleeve, B1 bob, and F1 torsion spring:

$$\mu = \frac{300}{N}\theta_N \qquad \text{Equation 4}$$

Where
μ=viscosity, (cp)
N=viscometer speed, shear rate (rpm)
$\theta_N$=viscometer reading, shear stress (lbf/100 ft²)

The rheology of geopolymer barrier compositions may be modeled based on Bingham plastic flow behavior. In particular, the geopolymer barrier composition having Saudi Arabian volcanic ash behaves as a rigid body at lesser shear stress but flows as a viscous fluid at greater shear stress. The rheological behavior of the geopolymer barrier composition may be determined by measuring the shear stress on the geopolymer barrier composition at different shear rates, which may be accomplished by measuring the shear stress and/or shear rate on the geopolymer barrier composition using a FANN® Model 35 viscometer operated at 3 rpm, 6 rpm, 100 rpm, 200 rpm, 300 rpm, or 600 rpm, for example. A Bingham plastic fluid may be modeled by Equation 5.

$$\tau=(PV)\dot{\gamma}+4.79YP \qquad \text{Equation 5}$$

Where
τ=shear stress, (dynes per square centimeter (dyne/cm²))
PV=plastic viscosity, (cP)
$\dot{\gamma}$=shear rate, (s⁻¹)
YP=yield point, (lbf/100 ft²)

The rheology of the geopolymer barrier composition may be evaluated from the plastic viscosity (PV) and the yield point (YP), which are parameters from the Bingham plastic rheology model. The PV is related to the resistance of the geopolymer barrier composition to flow due to mechanical interaction between the solids of the geopolymer barrier composition and represents the viscosity of the geopolymer barrier composition extrapolated to infinite shear rate. In other words, the PV is the slope of the shear stress versus shear rate curve of the Bingham plastic model. The PV reflects the type and concentration of the solids in the geopolymer barrier composition, and a lesser PV is preferred. The PV of the geopolymer barrier composition may be estimated by measuring the shear stress of the geopolymer barrier using a FANN® Model 35 viscometer at shear rates of 300 rpm and 600 rpm and subtracting the 300 rpm shear stress measurement from the 600 rpm shear stress measurement according to Equation 6.

$$PV=\theta_{600}-\theta_{300} \qquad \text{Equation 6}$$

Where
PV=plastic viscosity, (cP)
$\theta_{600}$=shear stress viscometer reading at 600 rpm, (lbf/100 ft²)
$\theta_{300}$=shear stress viscometer reading at 300 rpm, (lbf/100 ft²)

When the shear stress measurement at 600 rpm is not available, the plastic viscosity may be calculated by determining the difference between any two shear stress measurements, dividing the difference by the difference of the shear rates that the two shear stresses were measured at, and multiplying that factor by 300. This formula is provided in Equation 7.

$$PV = \frac{300}{N_2 - N_1}(\theta_{N_2} - \theta_{N_1}) \qquad \text{Equation 7}$$

Where
PV=plastic viscosity, (cP)
N=viscometer speed, shear rate (rpm)
$\theta_N$=shear stress viscometer reading at N rpm, (lbf/100 ft²)

The YP represents the shear stress less than which the geopolymer barrier composition behaves as a rigid body and greater than which the geopolymer barrier composition flows as a viscous fluid. In other words, the YP represents the amount of stress required to move the geopolymer barrier composition from a static condition. The yield point is the resistance of initial flow of a fluid, or the stress required in order to move the fluid. It can be simply stated that the yield point is the attractive force among colloidal particles in geopolymer barrier. The YP of a geopolymer barrier composition is correlated with the capacity of the geopolymer barrier composition to carry rock cuttings through the annulus, which in simplified terms indicates the geopolymer barrier composition's hole-cleaning ability. Yield point affects both the start-up pressure after a temporary shut-down and the void filling properties of cements during cementing operations. YP of equal to or greater than 15 lbf/100 ft² is considered acceptable for drilling. The YP is determined by extrapolating the Bingham plastic rheology model to a shear rate of zero. In other words, the PV is the y-intercept of the shear stress v. shear rate curve of the Bingham plastic model. The YP of the geopolymer barrier composition may be estimated from the PV from Equation 7 by subtracting the PV from Equation 7 from the shear stress of the geopolymer barrier measured at 300 rpm according to Equation 8.

$$YP=\theta_{300} - PV \qquad \text{Equation 8}$$

The YP is expressed as a force per area, such as in field units of lbf/100 ft², for example. The YP may be converted to SI units of dyne/cm², as 1 lbf/100 ft²=4.79 dyne/cm².

The geopolymer barrier may have a plastic viscosity of from 50 to 350 cP. In other embodiments, the geopolymer barrier may have a plastic viscosity of from 50 to 350 cP, from 50 to 300 cP, from 50 to 200 cP, from 50 to 150 cP, from 50 to 125 cP, from 50 to 100 cP, from 50 to 80 cP, from 50 to 60 cP, from 60 to 350 cP, from 60 to 300 cP, from 60 to 200 cP, from 60 to 150 cP, from 60 to 125 cP, from 60 to 100 cP, from 60 to 80 cP, from 80 to 350 cP, from 80 to 300 cP, from 80 to 200 cP, from 80 to 150 cP, from 80 to 125 cP, from 80 to 100 cP, from 100 to 350 cP, from 100 to 300 cP, from 100 to 200 cP, from 100 to 150 cP, from 100 to 125 cP, from 100 to 100 cP, from 100 to 80 cP, from 125 to 350 cP, from 125 to 300 cP, from 125 to 200 cP, from 125 to 150 cP, from 150 to 350 cP, from 150 to 300 cP, from 150 to 200 cP, from 200 to 300 cP, from 200 to 350 cP, or from 300 to 350 cP.

The geopolymer barrier of the present disclosure may have a yield point of from 5 to 70 lbf/100 ft$^2$, from 5 to 60 lbf/100 ft$^2$, from 5 to 55 lbf/100 ft$^2$, from 5 to 40 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 70 lbf/100 ft$^2$, from 10 to 60 lbf/100 ft$^2$, from 10 to 55 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 70 lbf/100 ft$^2$, from 15 to 60 lbf/100 ft$^2$, from 15 to 55 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 70 lbf/100 ft$^2$, from 20 to 60 lbf/100 ft$^2$, from 20 to 55 lbf/100 ft$^2$, from 20 to 40 lbf/100 ft$^2$, from 20 to 30 lbf/100 ft$^2$, from 20 to 25 lbf/100 ft$^2$, from 25 to 70 lbf/100 ft$^2$, from 25 to 60 lbf/100 ft$^2$, from 25 to 55 lbf/100 ft$^2$, from 25 to 40 lbf/100 ft$^2$, from 25 to 30 lbf/100 ft$^2$, from 30 to 70 lbf/100 ft$^2$, from 30 to 60 lbf/100 ft$^2$, from 30 to 55 lbf/100 ft$^2$, from 30 to 40 lbf/100 ft$^2$, from 40 to 70 lbf/100 ft$^2$, from 40 to 60 lbf/100 ft$^2$, from 40 to 55 lbf/100 ft$^2$, from 55 to 70 lbf/100 ft$^2$, from 55 to 60 lbf/100 ft$^2$, or from 60 to 70 lbf/100 ft$^2$.

The gel strength of a geopolymer barrier refers to the shear stress of the geopolymer barrier composition measured at a low shear rate (such as 3 rpm or 6 rpm) following a defined period of time during which the geopolymer barrier composition is maintained in a static state. The shear stress of the geopolymer barrier composition at low shear rate may be measured using a standard oilfield viscometer, such as a FANN® Model 35 viscometer operated at low rpms, such as at 3 rpm or 6 rpm, according to the test methods described in API Recommended Practice For Field Testing Water-Based Cement (RP 13B-1/ISO 10414-1:2002) published August 2014 and incorporated by reference into this disclosure in its entirety. To measure the gel strength, the geopolymer barrier composition is first stirred by contacting the geopolymer barrier composition with the spindle of the viscometer and operating the viscometer at 600 rotations per minute (rpm). The viscometer is then turned off for period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the geopolymer barrier composition comes to rest in a static state. Upon expiration of the time period, the viscometer is turned back on at a low speed, such as 3 rpm for example, to generate a low shear rate. The viscometer reading is then taken. The gel strength of the geopolymer barrier composition is reported in units of lbf/100 ft$^2$.

The geopolymer barrier described in this disclosure may have a 10-second gel strength of from 5 to 50 lbf/100 ft$^2$, from 5 to 40 lbf/100 ft$^2$, from 5 to 35 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 50 lbf/100 ft$^2$, from 10 to 40 lbf/100 ft$^2$, from 10 to 35 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 50 lbf/100 ft$^2$, from 15 to 40 lbf/100 ft$^2$, from 15 to 35 lbf/100 ft$^2$, from 15 to 30 lbf/100 ft$^2$, from 15 to 25 lbf/100 ft$^2$, from 15 to 20 lbf/100 ft$^2$, from 20 to 50 lbf/100 ft$^2$, from 20 to 40 lbf/100 ft$^2$, from 20 to 35 lbf/100 ft$^2$, from 20 to 30 lbf/100 ft$^2$, from 20 to 25 lbf/100 ft$^2$, from 25 to 50 lbf/100 ft$^2$, from 25 to 40 lbf/100 ft$^2$, from 25 to 35 lbf/100 ft$^2$, from 25 to 30 lbf/100 ft$^2$, from 30 to 50 lbf/100 ft$^2$, from 30 to 40 lbf/100 ft$^2$, from 30 to 35 lbf/100 ft$^2$, from 35 to 50 lbf/100 ft$^2$, from 35 to 40 lbf/100 ft$^2$, or from 40 to 50 lbf/100 ft$^2$. The 10-second gel strength of the geopolymer barrier composition having Saudi Arabian volcanic ash may be compared to a 10-second gel strength of a comparative geopolymer barrier without Saudi Arabian volcanic ash. The 10-second gel strength of the geopolymer barrier composition having Saudi Arabian volcanic ash may be less than or equal to 90% of the 10-second gel strength of the comparative geopolymer barrier, or less than or equal to 80% of the 10-second gel strength of the comparative geopolymer barrier, or less than or equal to 70% of the 10-second gel strength of the comparative geopolymer barrier.

The geopolymer barrier may have a 10 minute gel strength of from 10 to 60 lbf/100 ft$^2$, from 10 to 50 lbf/100 ft$^2$, from 10 to 45 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 60 lbf/100 ft$^2$, from 15 to 50 lbf/100 ft$^2$, from 15 to 45 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 60 lbf/100 ft$^2$, from 20 to 50 lbf/100 ft$^2$, from 20 to 45 lbf/100 ft$^2$, from 20 to 40 lbf/100 ft$^2$, from 20 to 30 lbf/100 ft$^2$, from 20 to 25 lbf/100 ft$^2$, from 25 to 60 lbf/100 ft$^2$, from 25 to 50 lbf/100 ft$^2$, from 25 to 45 lbf/100 ft$^2$, from 25 to 40 lbf/100 ft$^2$, from 25 to 30 lbf/100 ft$^2$, from 30 to 60 lbf/100 ft$^2$, from 30 to 50 lbf/100 ft$^2$, from 30 to 45 lbf/100 ft$^2$, from 30 to 40 lbf/100 ft$^2$, from 35 to 60 lbf/100 ft$^2$, from 35 to 50 lbf/100 ft$^2$, from 35 to 45 lbf/100 ft$^2$, from 40 to 60 lbf/100 ft$^2$, from 40 to 50 lbf/100 ft$^2$, from 40 to 45 lbf/100 ft$^2$, from 45 to 60 lbf/100 ft$^2$, from 45 to 50 lbf/100 ft$^2$, or from 50 to 60 lbf/100 ft$^2$. The 10-minute gel strength of the geopolymer barrier composition having Saudi Arabian volcanic ash may be compared to a 10-minute gel strength of a comparative geopolymer barrier without Saudi Arabian volcanic ash. The 10-minute gel strength of the geopolymer barrier composition having Saudi Arabian volcanic ash may be less than or equal to 90% of the 10-minute gel strength of the comparative geopolymer barrier, or less than or equal to 80% of the 10-minute gel strength of the comparative geopolymer barrier, or less than or equal to 70% of the 10-minute gel strength of the comparative geopolymer barrier.

EXAMPLES

Example 1

Wavelength Dispersive X-ray Fluorescence (WDXRF) may be used to conduct elemental analysis. In WDXRF spectrometers, all of the elements in the sample are excited simultaneously. The different energies of the characteristic radiation emitted from the sample are diffracted into different directions by an analyzing crystal or monochrometer (similar to the action of a prism dispersing different colors of visible light into different directions). By placing the detector at a certain angle, the intensity of X-rays with a certain wavelength can be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

For the WDXRF analysis, a sample of Saudi Arabian volcanic ash was homogenized and manually grounded by an agate mortar and a pestle for several minutes to achieve fine particle size. Then, 4 grams of the Saudi Arabian volcanic ash powder was mixed well and homogenized with 0.9 grams of a binder (Licowax C micropowder PM (Hoechstwax)). Then, the powder was pressed with 20 tons of pressure to a pellet with 31 millimeter (mm) diameter. WDXRF analysis was then performed on the sample using the standardless Omnian 27 method. The composition is shown in Table 1 to be presented.

TABLE 1

Composition of Saudi Arabian Volcanic Ash

| Element | Wt. % |
|---|---|
| O | 44.2 |
| Si | 21.8 |
| Al | 8.5 |
| Fe | 8.5 |
| Ca | 6.4 |
| Mg | 4.2 |
| Na | 3.1 |
| Ti | 1.5 |
| K | 1.0 |
| P | 0.3 |
| Mn | 0.1 |

The WDXRF results show that the sample consisted of mainly O and Si with appreciable amounts of Al, Fe, Ca, Mg, and Na.

Example 2

X-ray powder diffraction (XRD) is a rapid analytical technique primarily used for phase identification of a crystalline material and can provide information on unit cell dimensions. The analyzed material is finely ground, homogenized, and average bulk composition is determined. X-ray diffractometers consist of three basic elements: an X-ray tube, a sample holder, and an X-ray detector. X-rays are generated in a cathode ray tube by heating a filament to produce electrons, accelerating the electrons toward a target by applying a voltage, and bombarding the target material with electrons. When electrons have sufficient energy to dislodge inner shell electrons of the target material, characteristic X-ray spectra are produced. These spectra consist of several components, the most common being $K\alpha$ and $K\beta$. $K\alpha$ consists, in part, of $K_{\alpha 1}$ and $K_{\alpha 2}$. $K_{\alpha 1}$ has a slightly shorter wavelength and twice the intensity as $K_{\alpha 2}$. The specific wavelengths are characteristic of the target material (Cu, Fe, Mo, Cr). Filtering, by foils or crystal monochrometers, is required to produce the monochromatic X-rays needed for diffraction. $K_{\alpha 1}$ and $K_{\alpha 2}$ are sufficiently close in wavelength such that a weighted average of the two is used. These X-rays are collimated and directed onto the sample. As the sample and detector are rotated, the intensity of the reflected X-rays is recorded. A detector records and processes this X-ray signal and converts the signal to a count rate which is then output to a device such as a printer or computer monitor.

For the XRD analysis, a sample of Saudi Arabian volcanic ash was homogenized and manually grounded by an agate mortar and a pestle for several minutes to achieve fine particle size. Then, 4 grams of the fine Saudi Arabian volcanic ash powder was mounted into the XRD sample holder by back pressing. XRD was then performed on the sample using the SALAM 014 method. The composition is shown in Table 2 to be presented.

TABLE 2

XRD Composition of Saudi Arabian Volcanic Ash

| Compound | Wt. % |
|---|---|
| Amorphous Material | 70 |
| Labradorite: $Ca_{0.65}Na_{0.32}(Al_{1.62}Si_{2.38}O_8)$ | 19 |
| Augite: $Ca(Fe,Mg)Si_2O_6$ | 6 |
| Forsterite: $Mg_2SiO_4$ | 5 |

The XRD results show that the sample consisted mainly of amorphous material with appreciable amounts of labradorite, augite, and forsterite. The WDXRF results confirmed the XRD findings.

Example 3

A geopolymer barrier was formed in accordance with the previous description. The composition is described in the tables to be presented.

TABLE 3

Composition of the Activation Solution to Be Added to Saudi Arabian Volcanic Ash

| Component | Amount (mL) |
|---|---|
| Water | 70 |
| NaOH | 41.2 |
| $Na_2SiO_3$ | 65 |

TABLE 4

Rheology Data for the Activation Solution

| 600 rpm | 6 |
|---|---|
| 300 rpm | 5 |
| 200 rpm | 4 |
| 100 rpm | 2 |
| 6 rpm | 2 |
| 3 rpm | 1 |
| PV | 1 cP |
| YP | 4 lbf/100 ft² |

The activation solution of Table 3 was mixed with Saudi Arabian volcanic ash to form Geopolymer Barrier 1 as shown below.

TABLE 5

Composition of Geopolymer Barrier 1

| Component | Amount |
|---|---|
| Water | 70 mL |
| $Na_2SiO_3$ | 65 mL |
| NaOH | 41.2 mL |
| Saudi Arabian Volcanic Ash | 300 g |

The physical properties of Geopolymer Barrier 1 were then measured and are provided in the tables to be presented.

TABLE 6

Geopolymer Barrier 1 Properties

| Density | 116 lb/ft³ |
|---|---|
| pH ($Na_2SiO_3$ and water) | 11.31 |
| pH ($Na_2SiO_3$, NaOH, and water) | 12.64 |

TABLE 7

| Rheology Data for Geopolymer Barrier 1 | |
| --- | --- |
| 600 rpm | 109 |
| 300 rpm | 72 |
| 200 rpm | 64 |
| 100 rpm | 59 |
| 6 rpm | 54 |
| 3 rpm | 45 |
| PV | 37 cP |
| YP | 35 lbf/100 ft² |
| 10 second gel strength | 56 lbf/100 ft² |
| 10 minute gel strength | 300 lbf/100 ft² |

Geopolymer Barrier 1 gelled and thickened within 2 hours. In other words, Geopolymer Barrier 1 had a thickening time of less than 2 hours at 100° F. and atmospheric pressure.

Activation Solution 2, which included 121.26 mL water, 105.17 mL Na$_2$SiO$_3$, and 30 mL NaOH was then mixed with Saudi Arabian volcanic ash to form Geopolymer Barrier 2 as shown below.

TABLE 8

| Composition of Geopolymer Barrier 2 | |
| --- | --- |
| Component | Amount |
| Water | 121.26 mL |
| Na$_2$SiO$_3$ | 105.17 mL |
| NaOH | 30 mL |
| Saudi Arabian Volcanic Ash | 300 g |

The physical properties of Geopolymer Barrier 2 were then measured and are provided in the tables to be presented.

TABLE 9

| Geopolymer Barrier 2 Properties | |
| --- | --- |
| Density | 105 lb/ft³ |
| pH (Na$_2$SiO$_3$ and water) | 11.32 |
| pH (Na$_2$SiO$_3$, NaOH, and water) | 11.86 |

TABLE 10

| Rheology Data for Geopolymer Barrier 2 | |
| --- | --- |
| 600 rpm | 37 |
| 300 rpm | 20 |
| 200 rpm | 15 |
| 100 rpm | 9 |
| 6 rpm | 3 |
| 3 rpm | 3 |
| PV | 17 cP |
| YP | 3 lbf/100 ft² |
| 10 second gel strength | 3 lbf/100 ft² |
| 10 minute gel strength | 18 lbf/100 ft² |

The compressive strength for the geopolymer cement slurry was measured by a hydraulic press with a destructive crush test using API RP 10B procedure. The compressive strength for Geopolymer Barrier 2 was determined to be 1394 psi. Geopolymer Barrier 2 gelled and thickened within 3 hours at 100° F. and atmospheric pressure. In other words, Geopolymer Barrier 2 had a thickening time of less than 3 hours.

Geopolymer Barrier 1 had a density of 116 lb/ft³. Geopolymer Barrier 2 had a density of 105 lb/ft³. It may be desirable to reduce the density of the geopolymer barrier to reduce the hydrostatic pressure exerted by the geopolymer barrier onto the subsurface formation. Additionally, it is desirable that the geopolymer barrier have a density of from 1 to 100 pcf, from 1 to 50 pcf, from 1 to 20 pcf, from 1 to 10 pcf, from 1 to 7 pcf, from 1 to 5 pcf, from 1 to 4 pcf, from 1 to 3 pcf, from 1 to 2 pcf, from 2 to 100 pcf, from 2 to 50 pcf, from 2 to 20 pcf, from 2 to 10 pcf, from 2 to 7 pcf, from 2 to 5 pcf, from 2 to 4 pcf, from 2 to 3 pcf, from 3 to 100 pcf, from 3 to 50 pcf, from 3 to 20 pcf, from 3 to 10 pcf, from 3 to 7 pcf, from 3 to 5 pcf, from 3 to 4 pcf, from 4 to 100 pcf, from 4 to 50 pcf, from 4 to 20 pcf, from 4 to 10 pcf, from 4 to 7 pcf, from 4 to 5 pcf, from 5 to 100 pcf, from 5 to 50 pcf, from 5 to 20 pcf, from 5 to 10 pcf, from 5 to 7 pcf, from 7 to 100 pcf, from 7 to 50 pcf, from 7 to 20 pcf, from 7 to 10 pcf, from 10 to 100 pcf, from 10 to 50 pcf, from 10 to 20 pcf, from 20 to 100 pcf, from 20 to 50 pcf, or from 50 to 100 pcf greater than the density of the subsurface formation. This may be desirable to avoid a kick.

Geopolymer Barrier 1 had a yield point of 35 lbf/100 ft². Geopolymer Barrier 2 had a yield point of 3 lbf/100 ft². It may be desirable to increase the yield point of the geopolymer barrier to reduce the penetration of the geopolymer barrier into the subsurface formation and to increase the reduction of lost circulation.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents. Unless otherwise stated within the application, all tests, properties, and experiments are conducted at room temperature and atmospheric pressure.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of reducing lost circulation in a wellbore comprising:
    introducing an activation solution comprising an aqueous solution, from 25 to 50 wt. % $Na_2SiO_3$, and from 15 to 35 wt. % NaOH into the wellbore;
    introducing Saudi Arabian volcanic ash into the wellbore, in which the Saudi Arabian volcanic ash is free of $TiO_2$ and comprises $SO_3$, CaO, $SiO_2$, $Al_2O_3$, $Fe_2O_3$, MgO, and $K_2O$; and
    allowing the Saudi Arabian volcanic ash to contact the activation solution in the wellbore, thereby forming a geopolymer barrier between the wellbore and a subsurface formation to reduce lost circulation in the wellbore.

2. The method of claim 1, in which the $Na_2SiO_3$ has a ratio of $Na_2O$ to $SiO_2$ of from 0.250:1 to 0.350:1.

3. The method of claim 1, in which the activation solution comprises $SiO_2$ in an amount of from 2 to 4 times the amount of $Al_2O_3$ present in the Saudi Arabian volcanic ash.

4. The method of claim 1, in which the activation solution comprises a pH of from 11.6 to 13.0.

5. The method of claim 1, in which the Saudi Arabian volcanic ash has a particle size of from 20 to 30 µm.

6. The method of claim 1, in which the Saudi Arabian volcanic ash comprises from 40 wt. % to 50 wt. % $SiO_2$ and from 10 wt. % to 20 wt. % $Al_2O_3$.

7. The method of claim 1, in which the Saudi Arabian volcanic ash comprises:
    from 0.05 wt. % to 0.2 wt. % $SO_3$;
    from 5 wt. % to 10 wt. % CaO;
    from 40 wt. % to 50 wt. % $SiO_2$;
    from 10 wt. % to 20 wt. % $Al_2O_3$;
    from 10 wt. % to 15 wt. % $Fe_2O_3$;
    from 5 wt. % to 10 wt. % MgO; and
    from 0.5 wt. % to 5 wt. % $K_2O$.

8. The method of claim 1, in which the aqueous solution comprises deionized water, tap water, fresh water, salt water, natural or synthetic brine, municipal water, formation water, produced water, well water, filtered water, distilled water, sea water, or combinations of these.

9. The method of claim 1, in which introducing Saudi Arabian volcanic ash into the wellbore comprises introducing an ash solution comprising an aqueous solution and Saudi Arabian volcanic ash, in which the aqueous solution comprises deionized water, tap water, fresh water, salt water, natural or synthetic brine, municipal water, formation water, produced water, well water, filtered water, distilled water, sea water, or combinations of these.

10. The method of claim 9, in which the ash solution comprises from 30 to 60 wt. % Saudi Arabian volcanic ash.

11. The method of claim 9, in which the ash solution further comprises a cement precursor material comprising one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, lime (calcium oxide), hexavalent chromium, trivalent chromium, calcium aluminate, and combinations thereof.

12. The method of claim 9, in which the ash solution further comprises one or more additives selected from the group consisting of dispersants, fluid loss control agents, retarders, expansion additives, antifoaming agents, stabilizers, accelerators, extenders, weighting agents, lost circulation control agents, surfactants, gypsum, hematite, manganese tetroxide, silica flour, and silica sand.

13. The method of claim 1, in which the geopolymer barrier has a compressive strength of from 1300 to 1500 psi.

14. The method of claim 1, in which the geopolymer barrier has a ratio of $Na_2SiO_3$ combined with NaOH to $Al_2O_3$ ranges from 0.5:1.0 to 9.0:1.0.

15. The method of claim 1, in which the geopolymer barrier comprises a sodium aluminosilicate hydrate.

16. The method of claim 15, in which the sodium aluminosilicate hydrate comprises a formula of:
    $Na_n\ [(-SiO_2)_z-AlO_2]_n \cdot y\ H_2O$, where n represents a degree of polymerization ranging 1 to 50 and z represents an amount of silicate ranging from 2 to 10.

17. The method of claim 15, in which the sodium aluminosilicate hydrate has a structure of:

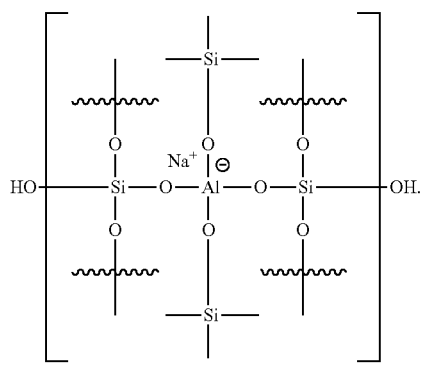
* * * * *